United States Patent
Chen et al.

(10) Patent No.: US 12,105,624 B2
(45) Date of Patent: Oct. 1, 2024

(54) METHOD FOR ACCELERATING READING OF STORAGE MEDIUM, READ ACCELERATION HARDWARE MODULE, AND MEMORY

(71) Applicant: DapuStor Corporation, Shenzhen (CN)

(72) Inventors: Xiang Chen, Shenzhen (CN); Xueming Cao, Shenzhen (CN); Ying Yang, Shenzhen (CN); Peng Huang, Shenzhen (CN); Zhou Yang, Shenzhen (CN)

(73) Assignee: DAPUSTOR CORPORATION, Shenzhen (CN)

( * ) Notice: Subject to any disclaimer, the term of this patent is extended or adjusted under 35 U.S.C. 154(b) by 0 days.

(21) Appl. No.: 18/201,754

(22) Filed: May 24, 2023

(65) Prior Publication Data
US 2023/0305956 A1    Sep. 28, 2023

Related U.S. Application Data

(63) Continuation of application No. PCT/CN2021/118472, filed on Sep. 15, 2021.

(30) Foreign Application Priority Data

Dec. 23, 2020   (CN) .......................... 202011539885.4

(51) Int. Cl.
*G06F 12/02*    (2006.01)

(52) U.S. Cl.
CPC .. *G06F 12/0292* (2013.01); *G06F 2212/1024* (2013.01); *G06F 2212/1032* (2013.01)

(58) Field of Classification Search
CPC ................. G06F 12/0292; G06F 12/02; G06F 2212/1024; G06F 2212/1032
(Continued)

(56) References Cited

U.S. PATENT DOCUMENTS 9,588,904 B1    3/2017 Lercari et al.
2012/0079174 A1*  3/2012 Nellans ............ G11C 11/40615
                                                    711/E12.008
(Continued)

FOREIGN PATENT DOCUMENTS

CN       104205059 A    12/2014
CN       110297780 A    10/2019
(Continued)

OTHER PUBLICATIONS

International Search Report issued in corresponding International Application No. PCT/CN2021/118472, mailed Nov. 26, 2021, 5 pages.

*Primary Examiner* — Than Nguyen
(74) *Attorney, Agent, or Firm* — Bayes PLLC

(57)    ABSTRACT

A method for accelerating reading of a storage medium, a read acceleration hardware module, and a memory are provided. The method includes: receiving logical block address (LBA) information issued from a front end (FE) of a memory; performing a table lookup operation based on a table lookup algorithm fixed in hardware to acquire valid physical media address (PMA) information corresponding to the LBA information; and converting the valid PMA information to Nand physical address (NPA) information based on an address translation algorithm fixed in the hardware, and reading corresponding data from a storage medium of the memory according to the NPA information.

17 Claims, 5 Drawing Sheets

(58) Field of Classification Search
USPC .......................................................... 711/208
See application file for complete search history.

(56) References Cited

U.S. PATENT DOCUMENTS

2016/0092113 A1*  3/2016  Veal ........................ G06F 3/064
                                                     711/103
2020/0066360 A1*  2/2020  Eno ..................... G11C 16/3495

FOREIGN PATENT DOCUMENTS

| CN | 110308863 A | 10/2019 |
| CN | 112559392 A | 3/2021 |

* cited by examiner

METHOD FOR ACCELERATING READING OF STORAGE MEDIUM, READ ACCELERATION HARDWARE MODULE, AND MEMORY

CROSS-REFERENCE TO RELATED APPLICATIONS

The present application is a continuation of International Application No. PCT/CN2021/118472, filed on Sep. 15, 2021, which claims the benefit of priority to Chinese Application No. 202011539885.4, filed on Dec. 23, 2020. The entire contents of each of the above-referenced applications are expressly incorporated herein by references.

TECHNICAL FIELD

The present application relates to the field of data reading and, in particular, to a method for accelerating reading of a storage medium, a read acceleration hardware module, and a memory.

BACKGROUND

With the development of big data, the requirement for data processing speed is increasingly higher. In the process of data processing, a series of operations such as data reading, data scanning, and data analysis are included. For the data reading part, the conventional data reading process in the prior art is as shown in FIG. 1. The host issues a read command to a front end (FE) of a memory: the FE receives and parses the read command, and sends information (including a logical block address (LBA)) obtained through parsing to a flash translation layer (FTL); the FTL converts the LBA information to Nand physical address (NPA) information and issues it to a back end (BE): the BE, upon receiving the NPA information, reads data corresponding to the NPA information from a storage medium and sends it back to the FE, so that the FE can return the data to the host, thereby completing the data reading process. However, the existing FTL, due to the problem of high latency and low efficiency in its processing method, has suffered from reduced read performance.

Therefore, it is necessary to provide a solution to the above technical problem.

SUMMARY

The objective of the present application is to provide a method for accelerating reading of a storage medium, a read acceleration hardware module, and a memory. In this application, the FTL processing method is discarded, and an algorithm fixed in hardware is used to process LBA information to obtain NPA information. Experimentally, it has been found that this can significantly increase the read bandwidth of the host, resulting in a significant increase in the amount of data read per unit of time, thereby greatly improving the reading performance.

To solve the above technical problem, the present application provides a method for accelerating reading of a storage medium, including:
receiving LBA information issued from an FE of a memory;
performing a table lookup operation based on a table lookup algorithm fixed in hardware to acquire valid physical media address (PMA) information corresponding to the LBA information; and
converting the valid PMA information to NPA information based on an address translation algorithm fixed in the hardware, and reading corresponding data from a storage medium of the memory according to the NPA information.

In some embodiments, the process of performing a table lookup operation based on a table lookup algorithm fixed in hardware to acquire valid PMA information corresponding to the LBA information includes:
acquiring the PMA information corresponding to the LBA information by looking up a logic to physical (L2P) table for representing a mapping relationship between the LBA information and the PMA information;
determining, by looking up a trim table for representing invalid PMA information corresponding to erased data, whether the PMA information is present in the invalid PMA information; and
if yes, determining that the PMA information is invalid; and
if not, determining that the PMA information is valid for the first time.

In some embodiments, the process of performing a table lookup operation based on a table lookup algorithm fixed in hardware to acquire valid PMA information corresponding to the LBA information further includes:
after determining that the PMA information is valid for the first time by looking up the trim table, determining, by looking up a remap table for representing corrupted data blocks, whether the PMA information is present in invalid PMA information corresponding to the corrupted data blocks; and
if yes, determining that the PMA information is invalid; and
if not, determining that the PMA information is valid for the second time.

In some embodiments, the process of performing a table lookup operation based on a table lookup algorithm fixed in hardware to acquire valid PMA information corresponding to the LBA information further includes:
determining, after determining that the PMA information is valid for the second time by looking up the remap table, whether the value of the PMA information is less than a preset maximum PMA value; and
if yes, determining that the PMA information is valid ultimately; and
if not, determining that the PMA information is invalid.

In some embodiments, the process of converting the valid PMA information to NPA information based on an address translation algorithm fixed in the hardware includes:
converting the valid PMA information to the NPA information according to a correspondence of bits between the PMA information and the NPA information.

In some embodiments, the PMA information is composed of SuperBlock information, superPage information, and mau information in sequence; and the NPA information is composed of block information, page information, lun information, ce information, chan information, and mauoff information in sequence; and
accordingly, the process of converting the valid PMA information to the NPA information according to a correspondence of bits between the PMA information and the NPA information includes:
disassembling the PMA information by bit to obtain the SuperBlock information, the superPage information, and the mau information;

multiplying the SuperBlock information by a preset coefficient value to obtain the block information of the NPA information;

using the superPage information as the page information of the NPA information; and using bit information for the mau information correspondingly as the lun information, the ce information, the chan information, and the mauoff information of the NPA information according to the correspondence of bits between the mau information and the lun information, the ce information, the chan information, and the mauoff information of the NPA information.

To solve the above technical problem, the present application also provides a read acceleration hardware module, including:

a DoorBell (DB) processing hardware module for triggering, upon receiving LBA information issued from an FE of a memory, an algorithm processing hardware module to process the LBA information to obtain NPA information; and the algorithm processing hardware module fixed with a table lookup algorithm and an address translation algorithm, which is used for implementing, when executing the table lookup algorithm and the address translation algorithm in sequence, the steps of any one of the above methods for accelerating reading of a storage medium.

In some embodiments, the DB processing hardware module and the algorithm processing hardware module are integrated within a BE of the memory;

and the BE includes:

a flash protocol handler (FPH) separately connected to the algorithm processing hardware module and a storage medium of the memory, which is used for reading corresponding data from the storage medium according to the NPA information and transmitting it to the algorithm processing hardware module; and advanced data management (ADM) connected separately to the algorithm processing hardware module and the FE, which is used for sending the corresponding data read from the storage medium back to the FE.

In some embodiments, an L2P table, a trim table, and a remap table that are required for the table lookup algorithm are stored in a double data rate (DDR) memory.

To solve the above technical problem, the present application further provides a memory, including an FE, a BE, a storage medium, a DDR memory, and any of the read acceleration hardware modules mentioned above.

The present application provides a method for accelerating reading of a storage medium, including: receiving LBA information issued from an FE of a memory; performing a table lookup operation based on a table lookup algorithm fixed in hardware to acquire valid PMA information corresponding to the LBA information by means of the table lookup; and converting the valid PMA information to NPA information based on an address translation algorithm fixed in the hardware, so that the BE of the memory reads corresponding data from a storage medium of the memory according to the NPA information and sends it back to the FE. As can be seen, the present application discards the FTL processing method and adopts an algorithm fixed in hardware to process LBA information to obtain NPA information, which is experimentally found to be able to significantly improve the read bandwidth of the host, resulting in a significant increase in the amount of data read per unit of time, thereby greatly improving the reading performance, The present application further provides a read acceleration hardware module and a memory, which have the same effects as the above acceleration method.

BRIEF DESCRIPTION OF DRAWINGS

In order to clearly illustrate the technical solutions in the embodiments of the present application, a brief description is made below to the prior art and the accompanying drawings. Obviously, the accompanying drawings in the following description are only some embodiments of the present application. Other drawings may be obtained by a person of ordinary skill in the art without making creative efforts.

DETAILED DESCRIPTION

The core of the present application is to provide a method for accelerating reading of a storage medium, a read acceleration hardware module, and a memory, which discards the FTL processing method and adopts an algorithm fixed in hardware to process LBA information to obtain NPA information. Experimentally, it has been found that this can significantly increase the read bandwidth of the host, resulting in a significant increase in the amount of data read per unit of time, thereby greatly improving the reading performance.

In order to make the objective, technical solutions, and advantages of embodiments of the present application clearer, the technical solutions in the embodiments of the present application will be described clearly below in conjunction with the accompanying drawings. It is apparent that the described embodiments are only a part, but not all, of the embodiments of the present application. Based on the embodiments in the present application, all other embodiments obtained by a person of ordinary skill in the art without making creative efforts shall fall within the scope of protection of the present application.

Figure 1:
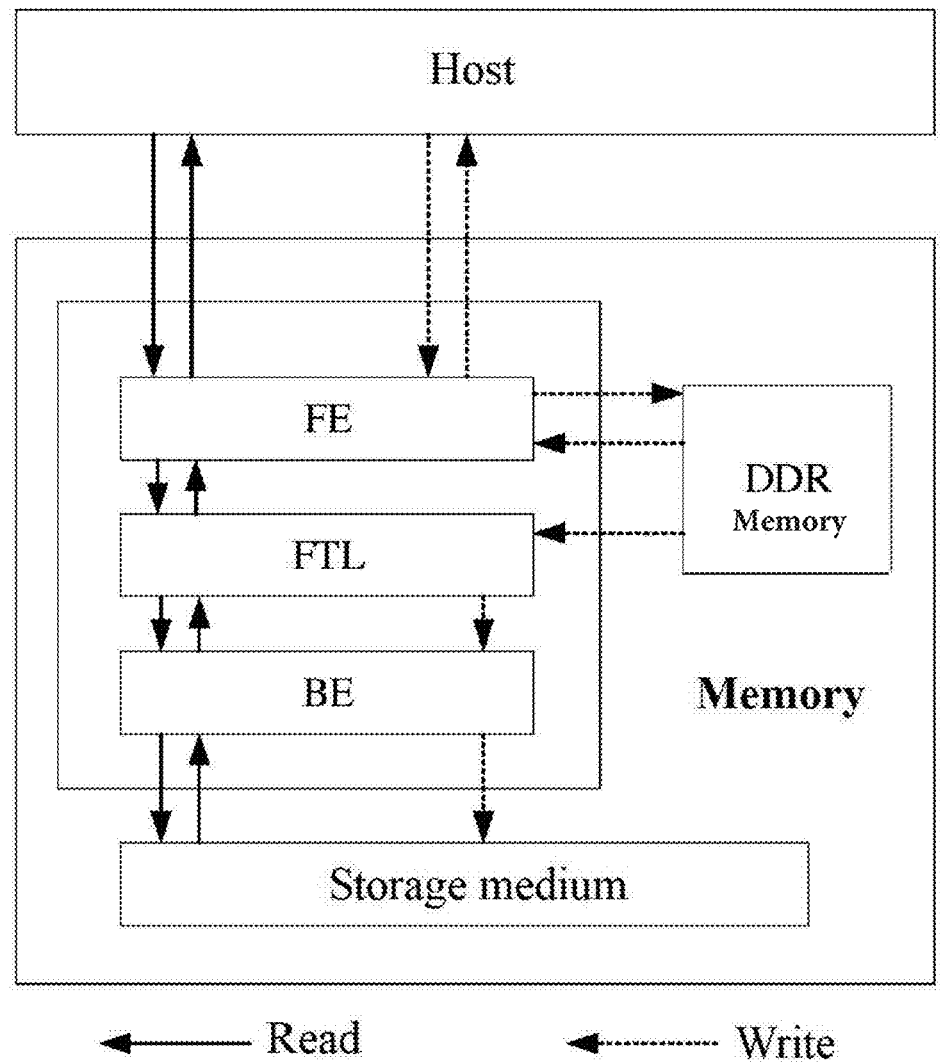
FIG. 1 is a schematic diagram of a data reading process in the prior art.
Figure 2:
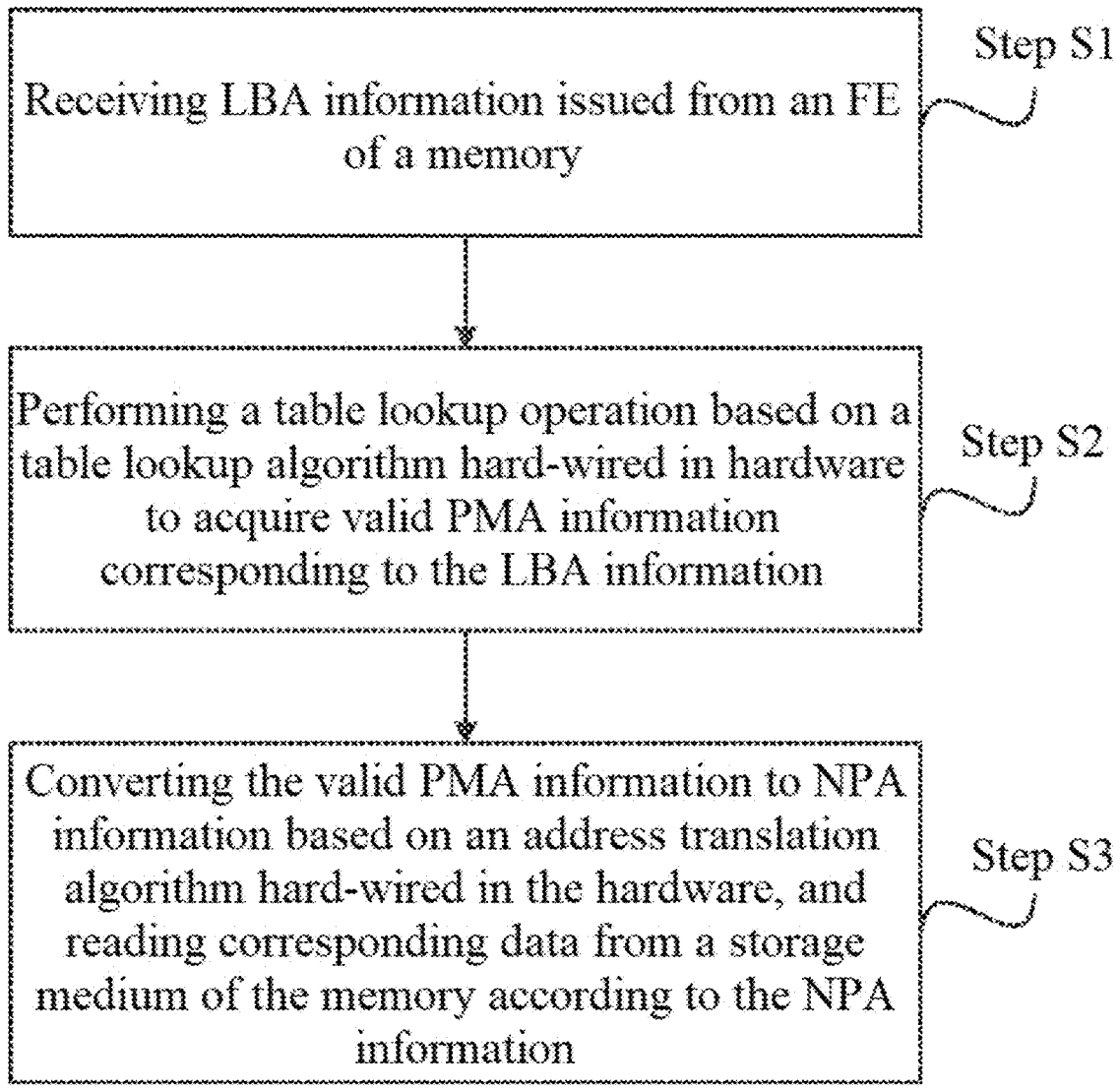
FIG. 2 is a flow chart of a method for accelerating reading of a storage medium provided by an embodiment of the present application.

Referring to FIG. 2, which is a flow chart of a method for accelerating reading of a storage medium provided by an embodiment of the present application.

The method for accelerating reading of a storage medium includes:

Step S1: receiving LBA information issued from an FE of a memory.

It should be noted that the method for accelerating reading of a storage medium of the present application is implemented by a read acceleration hardware module (referred to as RACC).

In some embodiments, the host sends a read command (containing the LBA information) to the FE of the memory: the FE of the memory parses the read command issued by the host to obtain the LBA information and issues the LBA information to the RACC; and the RACC receives the LBA information issued by the FE of the memory and starts to enter the processing process for the LBA information.

Step S2: performing a table lookup operation based on a table lookup algorithm fixed in hardware to acquire valid PMA information corresponding to the LBA information.

In some embodiments, the hardware of the RACC is fixed in advance with a table lookup algorithm for acquiring valid PMA information corresponding to LBA information, so upon receiving the LBA information issued from the FE of the memory, the RACC performs a table lookup operation based on the table lookup algorithm fixed in the hardware with the purpose of acquiring the valid PMA information corresponding to the LBA information by means of the table lookup for subsequent entry into the address translation process of the NPA information.

Step S3: converting the valid PMA information to NPA information based on an address translation algorithm fixed in the hardware, and reading corresponding data from a storage medium of the memory according to the NPA information.

In some embodiments, the hardware of the RACC is also fixed in advance with an address translation algorithm for converting PMA information to NPA information, so upon acquiring the valid PMA information, the RACC converts the valid PMA information to NPA information based on the address translation algorithm fixed in the hardware, and then sends the NPA information to the BE of the memory. The BE of the memory reads the corresponding data from the storage medium of the memory according to the NPA information and sends it back to the FE of the memory, so that the FE of the memory return the data read from the storage medium to the host, thereby completing the data reading process.

In addition, the read command issued by the host to the FE of the memory may also contain information such as namespaceId (namespace ID), portId (port ID), and dataFormat (format of read data), and the FE of the memory issues the LBA information and the information such as namespaceId, portId, and dataFormat to the RACC. After processing the LBA information into the NPA information, the RACC sends the NPA information and the information such as namespaceId, portId, and dataFormat together to the BE of the memory for the BE of the memory to read the corresponding data from the storage medium of the memory according to the NPA information and the information such as namespaceId, portId, and dataFormat and sends it back to the FE of the memory, which allows read acceleration to support multiple namespaces, multiple dataFormats, and multiple ports at the same time.

The present application provides a method for accelerating reading of a storage medium, including: receiving LBA information issued from an FE of a memory; performing a table lookup operation based on a table lookup algorithm fixed in hardware to acquire valid PMA information corresponding to the LBA information by means of the table lookup; and converting the valid PMA information to NPA information based on an address translation algorithm fixed in the hardware, so that the BE of the memory reads corresponding data from a storage medium of the memory according to the NPA information and sends it back to the FE. As can be seen, the present application discards the FTL processing method and adopts an algorithm fixed in hardware to process LBA information to obtain NPA information. Experimentally, it has been found that this can significantly increase the read bandwidth of the host, resulting in a significant increase in the amount of data read per unit of time, thereby greatly improving the reading performance.

Figure 3:
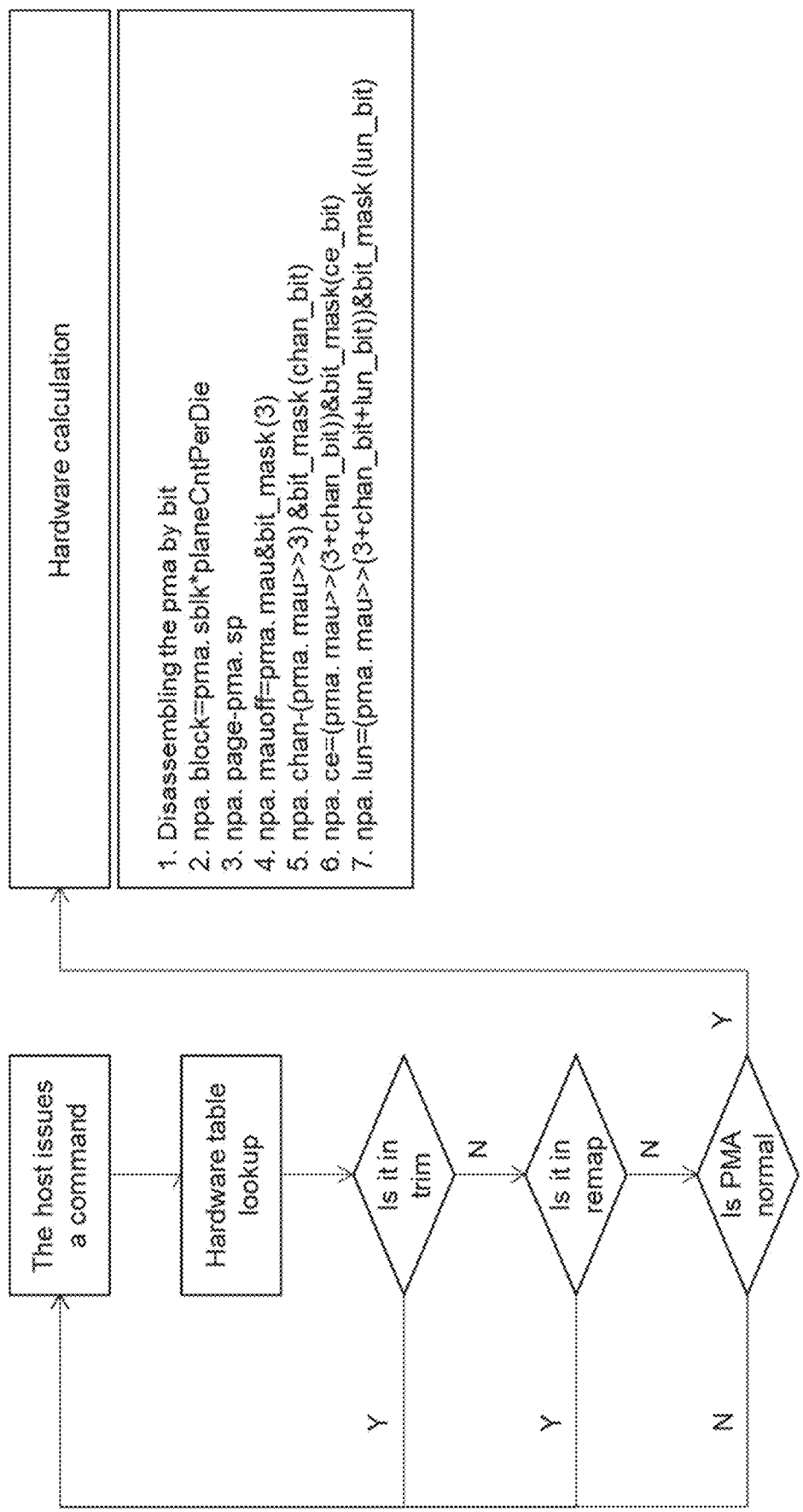
FIG. 3 is another flow chart of a method for accelerating reading of a storage medium provided by an embodiment of the present application.

On the basis of the above embodiments:

Referring to FIG. 3, which is another flow chart of a method for accelerating reading of a storage medium provided by an embodiment of the present application.

In some embodiments, the process of performing a table lookup operation based on a table lookup algorithm fixed in hardware to acquire valid PMA information corresponding to the LBA information includes:
  acquiring the PMA information corresponding to the LBA information by looking up an L2P table for representing a mapping relationship between the LBA information and the PMA information;
  determining, by looking up a trim table for representing invalid PMA information corresponding to erased data, whether the PMA information is present in the invalid PMA information; and
  if yes, determining that the PMA information is invalid; and
  if not, determining that the PMA information is valid for the first time.

In some embodiments, the present application has an L2P table for representing the mapping relationship between LBA information and PMA information, that is, the RACC can find the PMA information corresponding to the LBA information by looking up the L2P table.

At the same time, considering that the data stored in the memory may be erased by the user, PMA information corresponding to the erased data is invalid and should be filtered out and not enter the subsequent address translation process for the NPA information, so the present application has a trim table for representing the invalid PMA information corresponding to the erased data, which may be: one bit of the trim table corresponds to whether one piece of PMA information is valid, for example, "0" means that the corresponding PMA information is invalid, and "1" means that the corresponding PMA information is valid. On this basis, the RACC will look up the L2P table to find the PMA information corresponding to the LBA information, and then look up the trim table to determine whether the found PMA information is present in the invalid PMA information contained in the trim table; and if the found PMA information is present in the invalid PMA information contained in the trim table, it means that the found PMA information is invalid and should be filtered out and not enter the subsequent address translation process for the NPA information; and if the found PMA information is not present in the invalid PMA information contained in the trim table, it means that the found PMA information is valid for the first time, and if there is no other problem, it can enter the subsequent address translation process for the NPA information.

In some embodiments, the process of performing a table lookup operation based on a table lookup algorithm fixed in hardware to acquire valid PMA information corresponding to the LBA information further includes:
  after determining that the PMA information is valid for the first time by looking up the trim table, determining, by looking up a remap table for representing corrupted data blocks, whether the PMA information is present in invalid PMA information corresponding to the corrupted data blocks; and
  if yes, determining that the PMA information is invalid; and
  if not, determining that the PMA information is valid for the second time.

Further, considering that data blocks for data storage in the memory may be corrupted, and PMA information corresponding to data blocks that have already been corrupted is invalid and should be filtered out and not enter the subsequent address translation process for the NPA information, so the present application has a remap table for representing data blocks that have already been corrupted. On this basis, after determining that the PMA information is valid for the first time by looking up the trim table, the RACC determines whether the PMA information that is valid for the first time is present in invalid PMA information corresponding to data blocks that have already been corrupted by looking up the remap table: if the PMA information that is valid for the first time is present in the invalid PMA information corresponding to data blocks that have already been corrupted, it means that the PMA information that is valid for the first time should be invalid and should be filtered out and not enter the subsequent address translation process for the NPA information; and if the PMA information that is valid for the first time is not present in the invalid PMA information corresponding to data blocks that have already been corrupted, it means that the PMA information that is valid for the first time is still valid, and if there is no other problem, it can enter the subsequent address translation process for the NPA information.

In some embodiments, the process of performing a table lookup operation based on a table lookup algorithm fixed in hardware to acquire valid PMA information corresponding to the LBA information further includes:

determining, after determining that the PMA information is valid for the second time by looking up the remap table, whether the value of the PMA information is less than a preset maximum PMA value; and if yes, determining that the PMA information is valid ultimately; and If not, determining that the PMA information is invalid.

Further, considering that there exists a maximum value for the PMA information, if the value of the PMA information found through the L2P table is greater than the maximum value, it means that the PMA information found is abnormal, that is, the PMA information is invalid and should be filtered out and not enter the subsequent address translation process for the NPA information, so the present application sets the maximum PMA value in advance reasonably according to the actual situation. For example, when the PMA information is 32 bit, the maximum PMA value is set to maxU32-5 (maxU32: the binary maximum value of 32 bit is converted to a decimal value, and then the value result of the converted decimal value minus 5 is used as the maximum PMA value; and the reserved 5 is used for the determination of specific PMAs such as UNMAP, UNC, DEBUG, INVALID, and TRIM, and it should be noted that the reserved value can be adjusted according to the actual situation). On this basis, after determining that the PMA information is valid for the second time by looking up the remap table, the RACC determines whether the value of the PMA information valid for the second time is less than the preset maximum PMA value; and if the value of the PMA information valid for the second time is not less than the preset maximum PMA value, it means that the PMA information valid for the second time should be invalid and should be filtered out and not enter the subsequent address translation process for the NPA information; and if the value of the PMA information valid for the second time is less than the preset maximum PMA value, it means that the PMA information valid for the second time is still valid and can directly enter the subsequent address translation process for the NPA information.

In some embodiments, the process of converting the valid PMA information to NPA information based on an address translation algorithm fixed in the hardware includes:

converting the valid PMA information to the NPA information according to a correspondence of bits between the PMA information and the NPA information.

In some embodiments, considering that there exists a certain correspondence of bits between the PMA information and the NPA information, the RACC can convert the valid PMA information to the NPA information according to the correspondence of bits between the PMA information and the NPA information.

In some embodiments, the PMA information is composed of SuperBlock information, superPage information, mau information (mau refers to media AU, i.e., the smallest unit of the medium) in sequence; and the NPA information is composed of block information, page information, lun information (lun refers to the logical unit number), ce information (ce refers to chip enable information), and chan information (chan refers to channel), and mauoff information in sequence; and accordingly, the process of converting the valid PMA information to the NPA information according to a correspondence of bits between the PMA information and the NPA information includes:

disassembling the PMA information by bit to obtain the SuperBlock information, the superPage information, and the mau information;

multiplying the SuperBlock information by a preset coefficient value to obtain the block information of the NPA information;

using the superPage information as the page information of the NPA information; and using bit information for the mau information correspondingly as the lun information, the ce information, the chan information, and the mauoff information of the NPA information according to the correspondence of bits between the mau information and the lun information, the ce information, the chan information, and the mauoff information of the NPA information.

Figure 4:
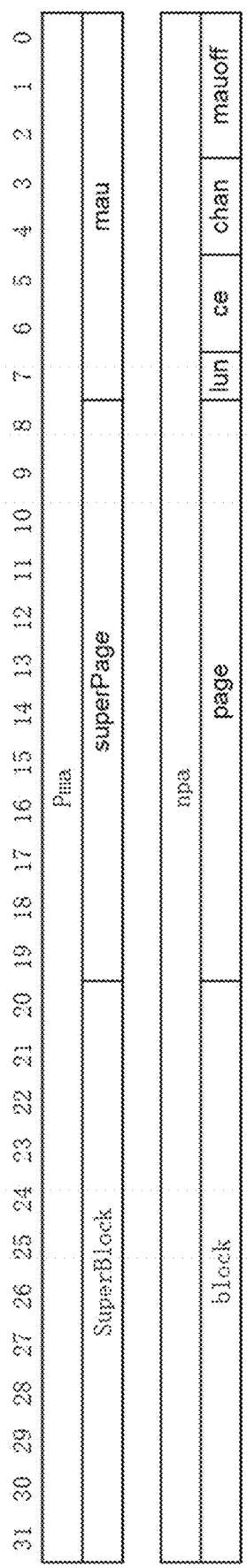
FIG. 4 is a diagram of the correspondence of bits between PMA information and NPA information provided by an embodiment of the present application.

In some embodiments, as shown in FIG. 4, the PMA information is composed of SuperBlock information, superPage information, and mau information in sequence, and the NPA information is composed of block information, page information, lun information, ce information, chan information, and mauoff information in sequence, and there exists a certain correspondence of bits between the two: the SuperBlock information value of the PMA information×a preset coefficient value=the block information value of the NPA information (the preset coefficient value is related to the Nand particle, and the SuperBlockId in the PMA is converted to the BlockId of the actual physical location in the Nand by multiplying the preset coefficient value, with different assignment for different particles): the superPage information value of the PMA information=the page information value of the NPA information; and the bit information values of the mau information of the PMA information are correspondingly equal to the lun information, the ce information, the chan information, and the mauoff information of the NPA information. As shown in FIG. 4, the mauoff information occupies 3 bits, the ce information and the chan information separately occupy 2 bits, and the lun information occupies 1 bit (the numbers of bits occupied by these pieces of information are not limited to those listed here, and can be configured according to the actual particle needs), then the mauoff information value=the information value composed of bits 2, 1, and 0 of the mau information, the chan information value=the information value composed of bits 4 and 3 of the mau information, the ce information value=the information value composed of bits 6 and 5 of the mau information, and the lun information value=the information value of bit 7 of the mau information.

On this basis, the procedure of converting the PMA information to the NPA information is as follows: disassembling the PMA information by bit to obtain the SuperBlock information, the superPage information, and the mau information; multiplying the SuperBlock information by a preset coefficient value to obtain the block information of the NPA information; using the superPage information as the page information of the NPA information; and using bit information for the mau information correspondingly as the lun information, the ce information, the chan information, and the mauoff information of the NPA information according to the correspondence of bits between the mau information and the lun information, the ce information, the chan information, and the mauoff information of the NPA information. In some embodiments, the mauoff information, the chan information, the ce information, and the lun information of the NPA information can be obtained in sequence by means of shift processing, that is: taking the value of the last bits of the mau information that are the same as bits occupied by the mauoff information as the mauoff information value (as shown in FIG. 4, the mauoff information occupies 3 bits, and taking the value of the last bits of the mau information that are the same as bits occupied by the mauoff information as the mauoff information value means: taking the value of the last bits 2, 1, and 0 of the mau information as the mauoff information value); shifting the mau information to the right to remove the value of the last bits of the mau information that are the same as bits occupied by the mauoff information (as shown in FIG. 4, removing the value of the last bits of the mau information that are the same as bits occupied by the mauoff information means: removing the last bits 2, 1, and 0 of the mau information, then the original bits 5, 4, and 3 of the mau information replace the original bits 2, 1, and 0 of the mau information), and taking the value of the last bits of the mau information after removal processing that are the same as bits occupied by the chan information as the chan information value (as shown in FIG. 4, the chan information occupies 2 bits, namely, taking the value of the bits 4 and 3 which currently are the last bits of the mau information as the chan information value, and the same applies to the subsequent process, which will not be described in detail in the present application); continuing to shift the mau information to the right in order to remove the value of the last bits of the mau information that are the same as bits occupied by the chan information (as shown in FIG. 4, the bits 4 and 3 which currently are the last bits of the mau information are removed, then the original bits 6 and 5 of the mau information replace the bits 4 and 3 which currently are the last bits of the mau information, and the same applies to the subsequent process, which will not be described in detail in the present application), and taking the value of the last bits of the mau information after the removal processing that are the same as bits occupied by the ce information as the ce information value; and continuing to shift the mau information to the right to remove the value of the last bits of the mau information that are the same as bits occupied by the ce information, and taking the value of the last bit of the mau information after the removal processing that is the same as the bit occupied by the lun information as the lun information value, thereby obtaining the NPA information.

In summary, the above method for accelerating reading of a storage medium has significantly improved the host read bandwidth compared with the conventional method. In the case of a 5M CPU, the measured data is as follows: for processing of a host read by the conventional method, the measured bandwidth is 2000 KiB/s; and for processing of a host read by the above method for accelerating reading of a storage medium, the measured bandwidth is 3999 KiB/s.

Figure 5:
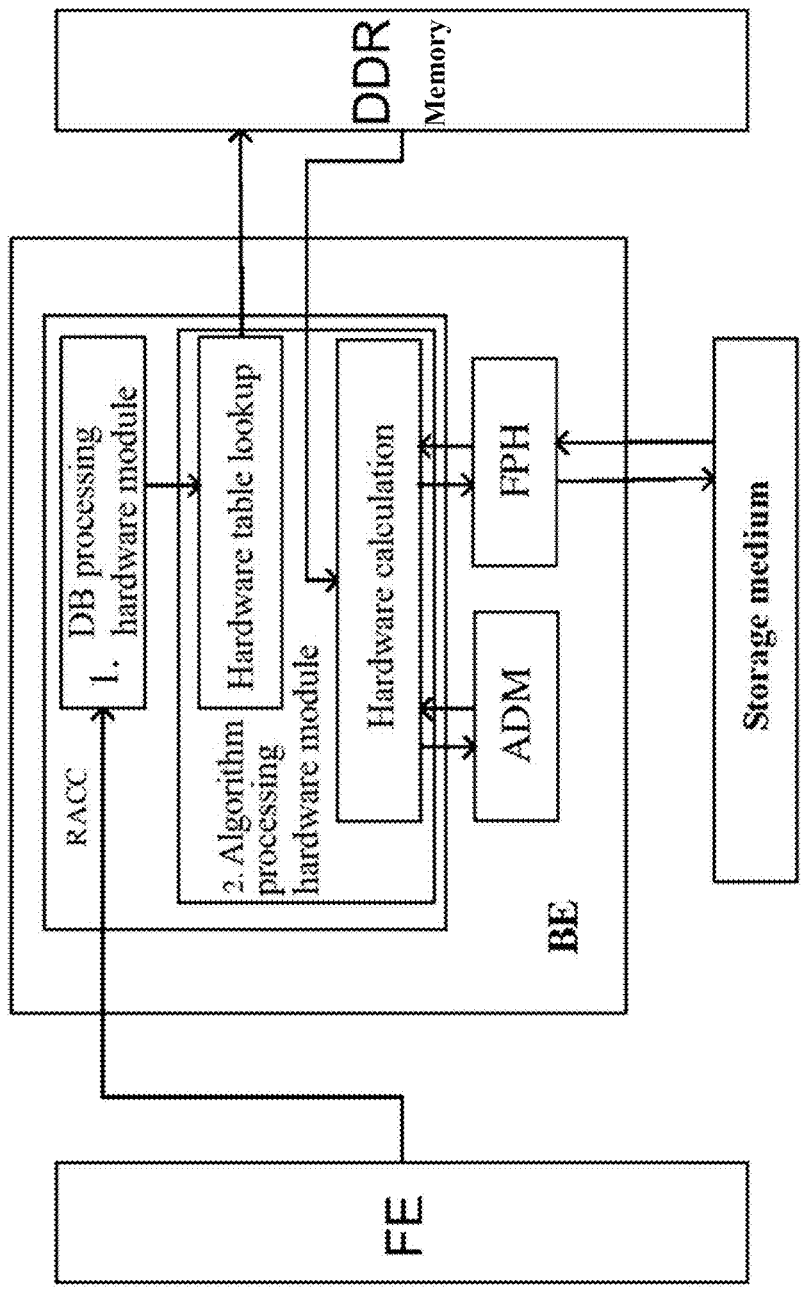
FIG. 5 is a schematic structural diagram of a read acceleration hardware module provided by an embodiment of the present application.

Refer to FIG. 5, which is a schematic structural diagram of a read acceleration hardware module provided by an embodiment of the present application.

This read acceleration hardware module includes:
a DB processing hardware module 1 for triggering, upon receiving LBA information issued from an FE of a memory, an algorithm processing hardware module 2 to process the LBA information to obtain NPA information; and
the algorithm processing hardware module 2 fixed with a table lookup algorithm and an address translation algorithm, which is used for implementing, when executing the table lookup algorithm and the address translation algorithm in sequence, the steps of any one of the above methods for accelerating reading of a storage medium.

In some embodiments, the read acceleration hardware module (referred to as RACC) of the present application includes a DoorBell (DB) processing hardware module 1 and an algorithm processing hardware module 2, where the DB processing hardware module 1 triggers, upon receiving LBA information issued from a FE of a memory, the algorithm processing hardware module 2 to perform address processing operation, and the algorithm processing hardware module 2 mainly processes the LBA information to obtain NPA information. For the processing principle thereof, refer to the above embodiments of the method for accelerating reading of a storage medium, which will not be repeated here in the present application.

In some embodiments, the DB processing hardware module 1 and the algorithm processing hardware module 2 are integrated in the BE of the memory.

The BE includes:
an FPH separately connected to the algorithm processing hardware module 2 and a storage medium of the memory, which is used for reading corresponding data from the storage medium according to the NPA information and transmitting it to the algorithm processing hardware module 2; and
ADM connected separately to the algorithm processing hardware module 2 and the FE, which is used for sending the corresponding data read from the storage medium back to the FE.

In some embodiments, as shown in FIG. 5, the RACC of the present application can be integrated in the BE of the memory, and the BE of the memory includes advanced data management (ADM) and a flash protocol handler (FPH). In the BE of the memory, the FPH therein reads corresponding data from the storage medium according to the NPA information and transmit same to the algorithm processing hardware module 2, and the ADM therein sends the corresponding data read from the storage medium back to the FE of the memory, so that the FE of the memory returns the corresponding data read from the storage medium to the host.

In addition, if, when reading data from the storage medium, the FPH finds an uncorrectable error (UNC) in the data read, it does not return the data to the algorithm processing hardware module 2, and it is confirmed that the data reading is abnormal. In addition to this, there may also be an unmap error, that is, no data has been written in the storage medium corresponding to the converted NPA information, and the data reading process cannot be performed, and it is confirmed that the data reading is abnormal.

In some embodiments, an L2P table, a trim table, and a remap table that are required for the table lookup algorithm are stored in a DDR memory.

In some embodiments, the L2P table, the trim table, and the remap table that are required for the table lookup algorithm of the present application may be stored in a double data rate (DDR) memory, and then the algorithm processing hardware module 2 interacts with the DDR memory to complete the table lookup operations of the L2P table, the trim table, and the remap table.

The present application further provides a memory including an FE, a BE, a storage medium, a DDR memory, or any of the above read acceleration hardware modules.

The memory provided by the present application is described with reference to the embodiment of the read acceleration hardware module described above, which is not repeated here in the present application.

It should also be noted that in this specification, relationship terms such as first and second are used only to distinguish one entity or operation from another, and do not necessarily require or imply any such actual relationship or order between these entities or operations. Further, the terms "include," "contain," or any other variation thereof are intended to cover non-exclusive inclusion, so that a process, a method, an article, or a device that includes a set of elements includes not only those elements, but also other elements not expressly listed, or elements that are inherent to such a process, method, article, or device. Without further limitation, an element defined by the statement "including a . . . " does not preclude the existence of additional identical elements in the process, method, article, or device that includes the element.

The foregoing description of the disclosed embodiments enables those skilled in the art to implement or use the present application. A variety of modifications to these embodiments will be apparent to those skilled in the art, and the general principles defined herein can be implemented in other embodiments without departing from the spirit or scope of the present application. Therefore, the present application will not be limited to those embodiments shown herein, but will be subject to the widest scope consistent with the principles and novel features disclosed herein.

The invention claimed is:

1. A method for accelerating reading of a storage medium, comprising:
    receiving logical block address (LBA) information issued from a front end (FE) of a memory;
    performing a table lookup operation based on a table lookup algorithm fixed in hardware to acquire valid physical media address (PMA) information corresponding to the LBA information, comprising:
        acquiring the PMA information corresponding to the LBA information by looking up a logic to a physical (L2P) table for representing a mapping relationship between the LBA information and the PMA information;
        determining, by looking up a trim table for representing invalid PMA information corresponding to erased data, whether the PMA information is present in the invalid PMA information;
        if the PMA information is present in the invalid PMA information, determining that the PMA information is invalid; and
        if the PMA information is not present in the invalid PMA information, determining that the PMA information is valid for a first time; and
    converting the valid PMA information to Nand physical address (NPA) information based on an address translation algorithm fixed in the hardware, and reading corresponding data from a storage medium of the memory according to the NPA information.

2. The method of claim 1, wherein performing the table lookup operation based on the table lookup algorithm fixed in the hardware to acquire the valid PMA information corresponding to the LBA information further comprises:
    after determining that the PMA information is valid for the first time by looking up the trim table, determining, by looking up a remap table for representing corrupted data blocks, whether the PMA information is present in invalid PMA information corresponding to the corrupted data blocks;
    if the PMA information is present in the invalid PMA information corresponding to the corrupted data blocks, determining that the PMA information is invalid; and
    if the PMA information is not present in the invalid PMA information corresponding to the corrupted data blocks, determining that the PMA information is valid for a second time.

3. The method of claim 2, wherein performing the table lookup operation based on the table lookup algorithm fixed in the hardware to acquire the valid PMA information corresponding to the LBA information further comprises:
    determining, after determining that the PMA information is valid for the second time by looking up the remap table, whether a value of the PMA information is less than a preset maximum PMA value;
    if the value of the PMA information is less than the preset maximum PMA value, determining that the PMA information is valid; and
    if the value of the PMA information is equal to or greater than the preset maximum PMA value, determining that the PMA information is invalid.

4. The method of claim 1, wherein converting the valid PMA information to the NPA information based on the address translation algorithm fixed in the hardware comprises:
    converting the valid PMA information to the NPA information according to a correspondence of bits between the PMA information and the NPA information.

5. The method of claim 4, wherein the PMA information is composed of Super Block information, super Page information, and mau information in sequence; and the NPA information is composed of block information, page information, lun information, ce information, chan information, and mauoff information in sequence; and
    converting the valid PMA information to the NPA information according to the correspondence of bits between the PMA information and the NPA information comprises:
        disassembling the PMA information by bit to obtain the Super Block information, the super Page information, and the mau information;
        multiplying the Super Block information by a preset coefficient value to obtain the block information of the NPA information;
        using the super Page information as the page information of the NPA information; and
        using bit information for the mau information as the lun information, the ce information, the chan information, and the mauoff information of the NPA information according to the correspondence of bits between the mau information and the lun information, the ce information, the chan information, and the mauoff information of the NPA information.

6. The method of claim 1, wherein the method is performed by a read acceleration hardware module (RACC), and the RACC is fixed in advance with the table lookup algorithm for acquiring the valid PMA information corresponding to the LBA information.

7. The method of claim 6, wherein receiving the LBA information issued from the FE of the memory comprises:
  sending a read command comprising the LBA information to the FE of the memory by a host;
  parsing the read command issued to obtain the LBA information and issuing the LBA information to the RACC by the FE of the memory; and
  receiving the LBA information and processing the LBA information by the RACC.

8. A read acceleration hardware module (RACC), comprising:
  a DoorBell (DB) processing hardware module, wherein the DB processing hardware module triggers, upon receiving logical block address (LBA) information issued from a front end (FE) of a memory, an algorithm processing hardware module to process the LBA information to obtain Nand physical address (NPA) information; and
  the algorithm processing hardware module, wherein the algorithm processing hardware module is fixed with a table lookup algorithm and an address translation algorithm, when executing the table lookup algorithm and the address translation algorithm in sequence, the algorithm processing hardware module implements operations comprising:
    performing a table lookup operation based on the table lookup algorithm fixed in hardware to acquire valid physical media address (PMA) information corresponding to the LBA information, comprising:
      acquiring the PMA information corresponding to the LBA information by looking up a logic to a physical (L2P) table for representing a mapping relationship between the LBA information and the PMA information;
      determining, by looking up a trim table for representing invalid PMA information corresponding to erased data, whether the PMA information is present in the invalid PMA information;
      if the PMA information is present in the invalid PMA information, determining that the PMA information is invalid; and
      if the PMA information is not present in the invalid PMA information,
    determining that the PMA information is valid for a first time; and
    converting the valid PMA information to NPA information based on the address translation algorithm fixed in the hardware, and reading corresponding data from a storage medium of the memory according to the NPA information.

9. The RACC of claim 8, wherein performing the table lookup operation based on the table lookup algorithm fixed in the hardware to acquire the valid PMA information corresponding to the LBA information further comprises:
  after determining that the PMA information is valid for the first time by looking up the trim table, determining, by looking up a remap table for representing corrupted data blocks, whether the PMA information is present in invalid PMA information corresponding to the corrupted data blocks;
  if the PMA information is present in the invalid PMA information corresponding to the corrupted data blocks, determining that the PMA information is invalid; and
  if the PMA information is not present in the invalid PMA information corresponding to the corrupted data blocks, determining that the PMA information is valid for a second time.

10. The RACC of claim 9, wherein performing the table lookup operation based on the table lookup algorithm fixed in the hardware to acquire the valid PMA information corresponding to the LBA information further comprises:
  determining, after determining that the PMA information is valid for the second time by looking up the remap table, whether a value of the PMA information is less than a preset maximum PMA value;
  if the value of the PMA information is less than the preset maximum PMA value, determining that the PMA information is valid; and
  if the value of the PMA information is equal to or greater than the preset maximum PMA value, determining that the PMA information is invalid.

11. The RACC of claim 8, wherein converting the valid PMA information to the NPA information based on the address translation algorithm fixed in the hardware comprises:
  converting the valid PMA information to the NPA information according to a correspondence of bits between the PMA information and the NPA information.

12. The RACC of claim 11, wherein the PMA information is composed of Super Block information, super Page information, and mau information in sequence; and the NPA information is composed of block information, page information, lun information, ce information, chan information, and mauoff information in sequence; and
  converting the valid PMA information to the NPA information according to the correspondence of bits between the PMA information and the NPA information comprises:
    disassembling the PMA information by bit to obtain the Super Block information, the super Page information, and the mau information;
    multiplying the Super Block information by a preset coefficient value to obtain the block information of the NPA information;
    using the super Page information as the page information of the NPA information; and
    using bit information for the mau information as the lun information, the ce information, the chan information, and the mauoff information of the NPA information according to the correspondence of bits between the mau information and the lun information, the ce information, the chan information, and the mauoff information of the NPA information.

13. The RACC of claim 8, wherein the DB processing hardware module and the algorithm processing hardware module are integrated within a back end (BE) of the memory,
  wherein the BE comprises:
  a flash protocol handler (FPH) separately connected to the algorithm processing hardware module and a storage medium of the memory, wherein the FPH is configured for reading corresponding data from the storage medium according to the NPA information and transmitting the corresponding data to the algorithm processing hardware module; and advanced data management (ADM) connected separately to the algorithm processing hardware module and the FE, wherein the ADM is configured for sending the corresponding data read from the storage medium back to the FE.

14. The RACC of claim 8, wherein;

the logic to the physical (L2P) table, the trim table, and a remap table required by the table lookup algorithm are stored in a double data rate (DDR) memory; and the algorithm processing hardware module is configured to interact with the DDR memory to complete the table lookup operation of the L2P table, the trim table, and the remap table.

15. A memory, comprising: a front end (FE), a back end (BE), a storage medium, and a read acceleration hardware module (RACC), wherein the RACC comprises:

a DoorBell (DB) processing hardware module, wherein the DB processing hardware module triggers, upon receiving logical block address (LBA) information issued from a front end (FE) of a memory, an algorithm processing hardware module to process the LBA information to obtain Nand physical address (NPA) information; and the algorithm processing hardware module, wherein the algorithm processing hardware module is fixed with a table lookup algorithm and an address translation algorithm, when executing the table lookup algorithm and the address translation algorithm in sequence, the algorithm processing hardware module implements operations comprising:

performing a table lookup operation based on the table lookup algorithm fixed in hardware to acquire valid physical media address (PMA) information corresponding to the LBA information, comprising:

acquiring the PMA information corresponding to the LBA information by looking up a logic to a physical (L2P) table for representing a mapping relationship between the LBA information and the PMA information;

determining, by looking up a trim table for representing invalid PMA information corresponding to erased data, whether the PMA information is present in the invalid PMA information;

if the PMA information is present in the invalid PMA information, determining that the PMA information is invalid; and if the PMA information is not present in the invalid PMA information, determining that the PMA information is valid for a first time; and converting the valid PMA information to the NPA information based on the address translation algorithm fixed in the hardware, and reading corresponding data from the storage medium of the memory according to the NPA information.

16. The memory of claim 15, wherein performing the table lookup operation based on the table lookup algorithm fixed in the hardware to acquire the valid PMA information corresponding to the LBA information further comprises:

after determining that the PMA information is valid for the first time by looking up the trim table, determining, by looking up a remap table for representing corrupted data blocks, whether the PMA information is present in invalid PMA information corresponding to the corrupted data blocks;

if the PMA information is present in the invalid PMA information corresponding to the corrupted data blocks, determining that the PMA information is invalid; and if the PMA information is not present in the invalid PMA information corresponding to the corrupted data blocks, determining that the PMA information is valid for a second time.

17. The memory of claim 16, wherein performing the table lookup operation based on the table lookup algorithm fixed in the hardware to acquire the valid PMA information corresponding to the LBA information further comprises:

determining, after determining that the PMA information is valid for the second time by looking up the remap table, whether a value of the PMA information is less than a preset maximum PMA value;

if the value of the PMA information is less than the preset maximum PMA value, determining that the PMA information is valid; and if the value of the PMA information is equal to or greater than the preset maximum PMA value, determining that the PMA information is invalid.

* * * * *